Figure 1:
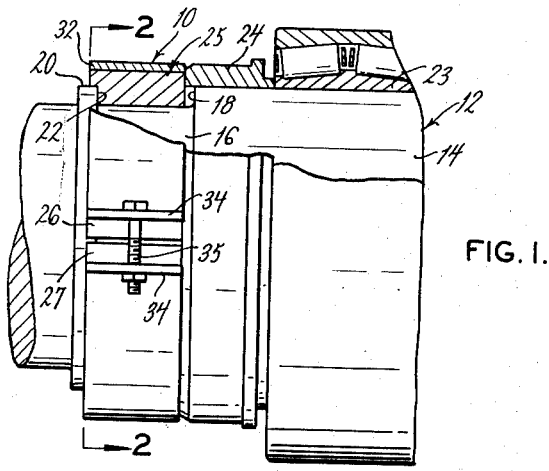

May 18, 1954

W. J. CHIEVITZ 2,678,856

STEP-WISE ADJUSTABLE BEARING RETAINER

Filed May 9, 1952

2 Sheets-Sheet 1

INVENTOR.
WILLIAM J. CHIEVITZ
BY *Gravely, Lieder,*
*Woodruff & Dean*
ATTORNEYS

May 18, 1954  W. J. CHIEVITZ  2,678,856
STEP-WISE ADJUSTABLE BEARING RETAINER
Filed May 9, 1952  2 Sheets-Sheet 2

INVENTOR.
WILLIAM J. CHIEVITZ
BY *Gravely, Lieder,*
*Woodruff & Lees*
ATTORNEYS

Patented May 18, 1954

2,678,856

UNITED STATES PATENT OFFICE 2,678,856

STEP-WISE ADJUSTABLE BEARING RETAINER

William J. Chievitz, Canton, Ohio, assignor to The Timken Roller Bearing Company, Canton, Ohio, a corporation of Ohio Application May 9, 1952, Serial No. 286,974

7 Claims. (Cl. 308—236)

The present invention relates generally to the bearings retainer art and more particularly to a novel step-wise adjustable bearing retainer construction, which is particularly applicable for use on mill roll necks and the like.

In the known constructions, the bearings on mill roll necks are maintained in position adjustably spaced from an outer shoulder by a plurality of members which have to be accurately machined and then accurately positioned on the mill roll neck. Included among these members is an adjustable nut which is threadedly mounted on an externally threaded split thrust ring, the adjustment of the spacing between the bearing and the shoulder being varied by rotating the nut relative to the threaded split ring. This type of construction is not completely satisfactory because the various parts have to be accurately machined and further, when the threaded thrust ring is cut in half the metal removed by the cutter leaves spaces between the ends of the ring segments so that when the ring is mounted on the roll neck these spaces have to be compensated for by positioning the ring segments in the same relative positions they occupied prior to the cutting operation. Consequently, it is very difficult and often impossible to start the adjusting nut on the externally threaded split ring.

It is an object of the present invention therefore, to provide a novel adjustable bearing retainer construction for adjusting the spacing between the bearing and an outer shoulder contained on the shaft, which is simple in construction and which contains relatively few parts. More particularly it is an object to provide such a construction which includes one or more simple split rings whereby the spacing between the bearing and the outer shoulder can be varied in step-wise fashion by simply reversing and/or interchanging the rings. Specifically, it is an object to provide such a construction which includes one or more split rings which have their side faces formed for cooperative engagement whereby the aforementioned spacing can be easily and quickly varied in a step-wise manner by merely reversing and/or interchanging the split rings.

Another object is to provide a simple and economical construction for maintaining the segments of split rings in position on the necks of mill rolls and the like. More particularly it is an object to provide such a construction which includes a flexible band-like annular member which is adapted to be disposed about the ring segments, and which includes means for adjusting the effective diameter of the annular member.

Further objects and advantages of the present invention will be apparent from the following detailed description, reference being had to the accompanying drawings wherein preferred embodiments of the present invention are shown.

Briefly, the invention comprises the use of one or more annular members which are adapted to be mounted on a shaft between a shoulder provided thereon and an anti-friction bearing mounted on the shaft for limited axial movement relative to the shoulder, said annular members containing opposed side faces having different configurations whereby the spacing between the shoulder and the bearing can be varied in step-wise fashion by reversing and/or interchanging the annular members. The annular members are preferably formed in segments and an adjustable annular band-like member is removably disposed about them to maintain the segments in position on the shaft.

Figure 2:
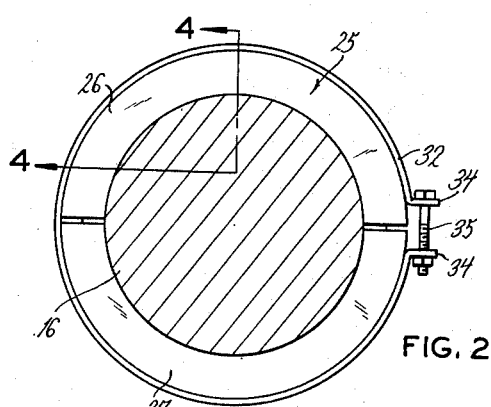
Figure 3:
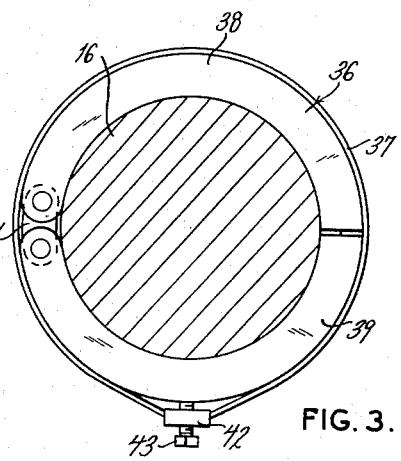
Figure 4:
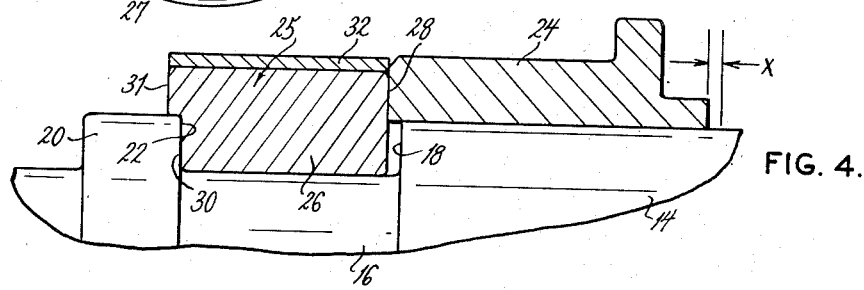
Figure 5:
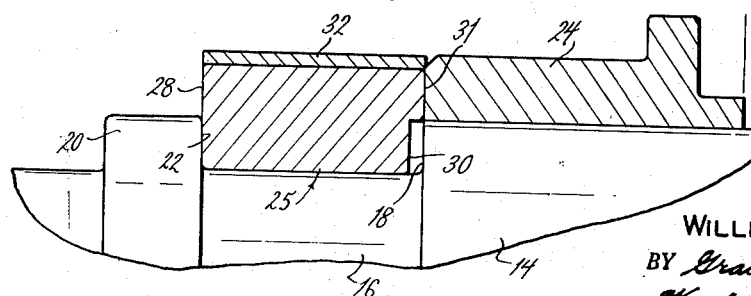
Figure 6:
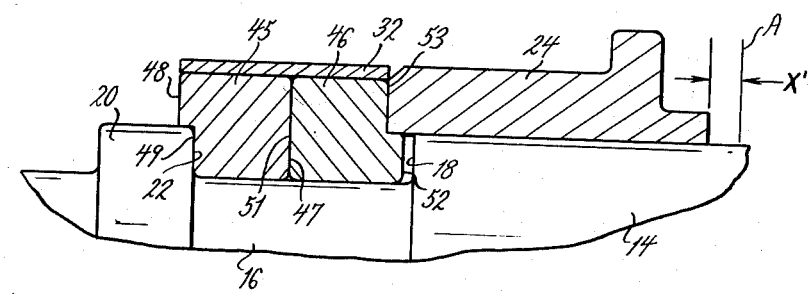
Figure 7:
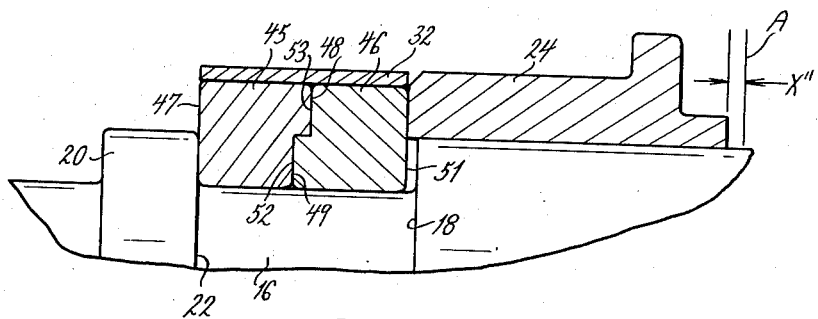
Figure 8:
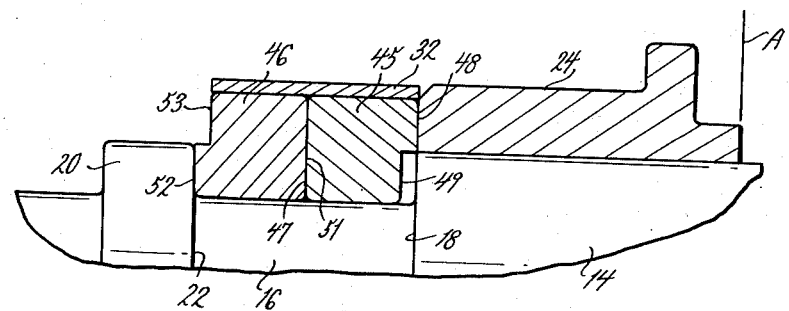

In the drawing:

Fig. 1 is a side elevational view of a portion of a mill roll neck provided with an adjustable bearing retainer constructed in accordance with the teachings of the present inventions, the view being partially in section to better illustrate the construction of the various parts, Fig. 2 is a vertical transverse sectional view taken on the line 2—2 in Fig. 1, Fig. 3 is a view similar to Fig. 2 illustrating a modified ring and retainer construction, Fig. 4 is an enlarged fragmentary, vertical sectional view taken on the line 4—4 in Fig. 2, the shaft being shown in elevation, Fig. 5 is a view similar to Fig. 4 but with the ring reversed, Fig. 6 is a view similar to Figs. 4 and 5, illustrating a retainer construction employing two split rings, and Figs. 7 and 8 are views similar to Fig. 6 but with the rings in different relative positions.

Referring to the drawings more particularly by reference numerals, specifically Figs. 1 and 2, 10 indicates generally a step-wise adjustable bearing retainer construction embodying the teachings of the present invention, shown mounted on a mill roll neck 12.

The mill roll neck 12 includes a cylindrical portion 14 of constant diameter, and immediately adjacent thereto a portion 16 of reduced diameter, so as to form an inner shoulder 18 therebetween. Spaced outwardly from the inner shoulder 18 is an annular ridge 20 which forms an outer shoulder 22, the outer diameter of the ridge 20 being substantially the same as the outer diameter of the cylindrical portion 14.

A conventional anti-friction type bearing including a double bearing cone 23, is mounted on the portion 14 of the mill roll neck 12 for limited axial movement relative to the shoulder 22. The inner end of the cone 23 abuts a spacer ring (not shown) which in turn bears against a shoulder (not shown) formed between the neck 12 and the body portion of the mill roll. This part of the construction is not shown in the drawing because it is conventional, and forms no part of the present invention.

Mounted on the cylindrical portion 14 adjacent the bearing is a thrust ring 24, the inner end of which bears against the outer end of the bearing cone 23 and the outer end thereof extends over the inner shoulder 18 of the mill roll neck.

A split ring 25 comprising upper and lower semi-circular segments 26 and 27, respectively, is mounted on the cylindrical portion 16 between the inner and outer shoulders 18 and 22, respectively.

As shown in Figs. 1 and 4, the split ring 25 has a vertical substantially smooth inner face 28 and an outer face which includes an inner surface 30 and an outer surface 31 spaced axially outwardly therefrom so that the distance between the face 28 and the surface 31 is greater than the distance between the face 28 and the surface 30. The radial distance between the inner surface of the split ring 25 and the innermost edge of the outer surface 31 is slightly greater than the height of the ridge 20 so that the inner surface 30 of the one side face bears against the outer shoulder 22, and the outer surface 31 extends over it.

Thus, with the split ring 25 in the position shown in Fig. 4, the thrust ring 24, which bears against the outer end of the bearing cone 23, is spaced inwardly from the outer shoulder 22 an amount equal to the distance between the side face 28 and the inner surface 30.

However, when the split ring is reversed (Fig. 5) so that the face 28 bears against the outer shoulder 22 and the outer surface 31 bears against the outer end of the thrust ring 24, the latter is spaced from the outer shoulder 22 an amount equal to the distance between the face 28 and the surface 31.

Thus, by merely reversing the split ring 25, the thrust ring 24 is moved inwardly a distance X as shown in Fig. 4, which is equal to the distance between the surfaces 30 and 31. It is apparent that the amount of this adjustment can be predetermined by the construction of the ring 25 whereby either a "fine" or a "rough" adjustment can be obtained.

To maintain the segments 26 and 27 in position of the mill roll neck, a retaining means is employed which includes an annular band 32 of flexible material which is opened at one side and which has tabs or ears 34 adjacent the opening. Aligned openings are contained in the tabs 34 to receive a bolt and nut assembly 35 for adjusting the effective diameter of the band 32. Thus, after unloosening the bolt and nut assembly 35, the band 32 can be slipped off the ring segments 26 and 27 to permit them to be reversed. After the reversal, the band 32 can be replaced and the bolt and nut assembly 35 tightened so as to maintain the segments in the new position.

The modified construction shown in Fig. 3 includes a slightly different type of split ring 36 and a retainer 37.

The ring 36 comprises two semi-circular shaped upper and lower segments 38 and 39 respectively, which are hinged together at one side by means of a link 41. In all other respects, particularly as to cross sectional shape and size, the ring 36 is the same as the ring 25 previously described.

The retainer 37 is in the form of a thin flexible metallic ring or band which fits about the segments and which is slightly larger in diameter than the outside diameter of the split ring 36. A flat lug 32 is fastened to the band and contains an internally threaded opening which receives a bolt 43. Thus, by threading the bolt 43 inwardly, the lug 32 is moved outwardly relative to the split ring 36 so as to pull the band 37 tightly about the segments 38 and 39, thereby securely retaining them in position.

As previously described, the use of single split ring provides only one adjustment, the magnitude of which is determined by the horizontal distance between the surfaces 30 and 31 (Figs. 4 and 5). Thus, by providing a series of rings of different widths, one can obtain various degrees of adjustment merely by replacing and reversing the rings. In short, each split ring provides two different adjustments.

Another construction for obtaining various degrees of adjustment is shown in Figs. 6–8, wherein at least two split rings 45 and 46 are employed simultaneously. The other parts of the construction, such as the inner and outer shoulders 18 and 22, respectively, and the retainer 32, are the same as previously described.

The split ring 45 has a continuous substantially vertical side face 47 and an opposed side face which comprises an outer surface 48, and an inner surface 49 offset axially a predetermined distance therefrom.

The split ring 46 has a continuous, substantially vertical, side face 51 and an opposed side face which contains an outer surface 52 and an inner surface 53 which are offset from each other a distance equal to the distance between the surfaces 48 and 49.

As shown more particularly in Fig. 6, the outer surface 48 is disposed outwardly a sufficient distance to extend over the top of the ridge 20, and the inner surface 52 is constructed to fit under the outer end of the thrust ring 24.

When the split rings 45 and 46 are positioned as shown in Fig. 6 with the continuous faces 47 and 51 abutting, the outer surface 53 bears against the outer end of the spacer ring 24, and the inner surface 49 abuts the shoulder 22. In this arrangement, the inner end of the thrust ring 24 is spaced a distance X' from a datum line A, and the outer end of the thrust ring 24 is spaced from the outer shoulder 22 a distance equal to the combined distances between the inner surface 49 and the face 47, and the face 51 and the outer surface 53.

However, when the rings 45 and 46 are reversed to occupy the positions shown in Fig. 7, as by turning them one hundred and eighty degrees about a vertical axis from their positions in Fig. 6, so that the offset surfaces nest together, the face 51 abuts the outer end of the thrust ring 24, and the face 47 bears against the shoulder 22. In this arrangement, the inner end of the spacer ring is a lesser distance X" away from the datum line A, and the outer end of the spacer ring 24 is positioned from the outer shoulder 22 a distance equal to the combined distances between the face 47 and the outer surface 48, and the outer surface 53 and the face 51.

When the positions of the rings 45 and 46 are merely interchanged from the positions shown in Fig. 7, so that the continuous faces 47 and 51 are abutting, as shown in Fig. 8, the inner end of the spacer ring 24 coincides with the datum line A. In this arrangement, the outer end of the spacer ring 24 abuts the outer surface 48 and is spaced from the outer shoulder 22 the maximum distance, which is the sum of the distances between the inner surface 52 and the face 51, and the face 47 and the outer surface 49.

Thus, it is apparent there has been provided a novel step-wise adjustable bearing retainer construction which fulfills all of the objects and advantages sought therefor. The position of the thrust ring 24, and the bearing against which it abuts, can easily be adjusted relative to the outer shoulder 22 to compensate for bearing wear, by merely reversing the single split ring. Also, by providing rings of various widths, twice as many adjustments as there are rings can be made by first reversing the ring and then replacing it with a wider ring.

When two rings constructed in accordance with the teachings of the present invention are used, they provide three different adjustments by first reversing the rings and then interchanging them.

Furthermore, the two forms of flexible band-like retaining members shown and described, hold the segments of the split rings securely in position and can be easily and quickly removed and replaced. In addition, they are exceedingly simple in construction and are relatively inexpensive to manufacture.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. In combination, a shaft containing a shoulder, an anti-friction bearing mounted on the shaft adjacent the shoulder for axial movement relative thereto; and means for adjusting the spacing between the shoulder and the bearing including at least one reversible annular member having opposed side faces of different configurations, whereby there is one spacing between the shoulder and the bearing when the annular member is in one position, and a different spacing between them when the annular member is reversed.

2. In combination, a shaft containing a shoulder; an anti-friction bearing mounted on the shaft adjacent the shoulder for axial movement relative thereto; and means for adjusting the spacing between the shoulder and the bearing including at least two reversible and interchangeable annular members each having opposed side faces of different configurations, whereby there is one spacing between the shoulder and the bearing when the annular members are in one position, a different spacing when the annular members are reversed, and a further different spacing when the annular members are interchanged.

3. In combination, a shaft containing a shoulder; an anti-friction bearing mounted on the shaft adjacent the shoulder for axial movement relative thereto; means for adjusting the spacing between the shoulder and the bearing including an annular member disposed about the shaft, said member being separated into segments and containing opposed side faces of different configurations; and means removably disposed about the annular member to maintain the segments thereof in position on the shaft.

4. In combination, a shaft containing a shoulder; an anti-friction bearing mounted on the shaft adjacent the shoulder for axial movement relative thereto; means for adjusting the spacing between the shoulder and the bearing including at least two annular members disposed about the shaft in juxtaposition, each annular member being separated into segments and containing opposed side faces of different configurations; and means removably disposed about the annular members to maintain the segments thereof in position on the shaft.

5. The combination of a shaft containing a shoulder; a sleeve-like member mounted on the shaft for axial movement relative to the shoulder; and an annular member disposed about the shaft between the shoulder and the sleeve-like member and containing opposed side faces, one of said side faces being substantially flat and the other being step-like in form with an inner surface and an outer surface in axial spaced relationship, the radial dimensions of the members being such that in one position of the annular member the outer surface of the one side face extends over the shoulder and the inner surface abuts it, and the substantially flat side face faces toward one end of the sleeve-like member, and in the reverse position of the annular member the outer surface of the one side face faces toward said one end of the sleeve-like member, and the substantially flat side face abuts the shoulder.

6. The combination of a shaft containing a shoulder; a sleeve-like member mounted on the shaft for axial movement relative to the shoulder; and two annular members disposed about the shaft in juxtaposition between the shoulder and the sleeve-like member, each of said annular members containing opposed side faces, one side face of each member being step-like in form with an outer surface and an inner surface, the outer surface of one member being shaped to extend over the shoulder, and the inner surface of the other member being shaped to fit under one end of the sleeve-like member.

7. The combination of a shaft containing a shoulder; a sleeve-like member mounted on the shaft for axial movement relative to the shoulder; and two annular members disposed about the shaft in juxtaposition between the shoulder and the sleeve-like member, each of said annular members containing opposed side faces, one side face of each member being step-like in form with an outer surface and an inner surface, and the other side face being substantially flat, the outer surface of one member being shaped to extend over the shoulder, and the inner surface of the other member being shaped to fit under one end of the sleeve-like member, and the step-like faces being adapted to nest together when brought into opposed position.

References Cited in the file of this patent

UNITED STATES PATENTS

| Number | Name | Date |
| --- | --- | --- |
| 1,606,077 | Johnson | Nov. 9, 1926 |
| 1,871,092 | Smith | Aug. 9, 1932 |
| 1,916,233 | Riblet | July 4, 1933 |

FOREIGN PATENTS

| Number | Country | Date |
| --- | --- | --- |
| 399,593 | France | July 1, 1909 |
| 267,942 | Italy | Sept. 27, 1929 |